United States Patent Office 2,893,896
Patented July 7, 1959

2,893,896

METHOD OF TREATING ORIENTED POLYETHYLENE TEREPHTHALATE FILM WITH AN HALOGENATED FATTY ACID

Allan Robert Andrew Beeber, Elizabeth, N.J., and Daniel S. Spechler, Brooklyn, N.Y., assignors to Keuffel & Esser Company, Hoboken, N.J., a corporation of New Jersey No Drawing. Application May 2, 1957
Serial No. 656,513

6 Claims. (Cl. 117—118)

This invention relates to a method of pre-treating a high molecular weight oriented polyethylene terephthalate film to make it receptive to coatings of organic materials. In recent years polyethylene terephthalate films are being used more and more in the drafting and reproduction fields. For these purposes it is necessary to apply various types of organic coatings to the polyethylene terephthalate film base. For example, coatings containing an abrasive material, such as silica, are applied in order to make the material receptive to pencil and ink lines. The material is then used for making drawings where dimensional stability is an important factor; for example, in lofting, as practiced in the aircraft industry. Since it is very often desirable to make copies of the highly dimensionally stable drawings, photosenstive coatings have also been applied to the polyethylene terephthalate base material. The present invention is particularly useful as a pre-treatment for polyethylene terephthalate base material to which it is desired to apply these various photosensitive or drafting surfaces.

Polyethylene terephthalate film is characterized by a hydrophobic chemically inert surface. As a result of the hydrophobic nature and chemical inertness of this surface, it is very difficult to form an adhesive bond between any organic coating and the polyethylene terephthalate film. Various techniques have been tried to improve the adhesion between this type of base material and various organic coatings.

These include abrading the surface in order to roughen it and treating the surface with chemical reagents in order to etch the surface. Now a treatment has been found which makes the surface receptive to a wide variety of organic coating materials without producing a visible etch on the film base. The pre-treatment of the present invention greatly improves the adhesion of a wide variety of organic resin materials, including vinyls, acrylics, cellulosics, styrene, polyethylene, alkyd resins, epoxy resins, electromers, etc.

According to the present invention, the polyethylene terephthalate film is coated with a solution of a halogenated fatty acid in an organic solvent and then the coated film is heated to a temperature in the range from 100° F. to 300° F. to remove the organic solvent, to react the halogenated fatty acid with the surface of the polyethylene terephthalate film, and to remove the excess halogenated fatty acid by evaporating it from the surface. Suitable halogenated fatty acids for the purposes of the present invention include chloracetic acid, dichloroacetic acid, trichloroacetic acid, trifluoroacetic acid, chloropropionic acid, perfluorocaprylic acid and similar halogenated fatty acids. These halogenated fatty acids may be dissolved in any inert solvent with which they are compatible. Suitable solvents include the hydrocarbons, particularly the aromatic hydrocarbons, alcohols, esters, such as ethyl acetate, halogenated hydrocarbons such as carbon tetrachloride, etc. However, aqueous solutions of the halogenated fatty acids do not work satisfactorily because such solutions do not wet the surface of the polyethylene terephthalate film evenly. When treating polyethylene terephthalate films according to the present invention, it is not necessary to neutralize the acid used by treating the surface with an alkaline material.

*Example 1*

A solution is made by dissolving 1.5 lbs. of trichloroacetic acid in 33.6 lbs. of toluol. This solution should be prepared in a glass or stainless steel container.

This solution is coated onto the surface of a polyethylene terephthalate film, for example, by means of a roller which is partly immersed in the solution and transfers the solution to the surface of the film. The film then passes into a heating chamber held at a temperature of about 250° F. which drives off the solvent and reacts the trichloroacetic acid with the surface of the film. The excess trichloroacetic acid is also driven off.

After being subjected to this treatment the film may be coated with any of the coatings disclosed in co-pending application, Serial #496,602, filed March 24, 1955, by Allan R. A. Beeber and Daniel S. Spechler. The adhesion of all of these coatings will be greatly improved because of the pre-treatment with trichloroacetic acid. Depending upon the exact results sought, it is possible to vary the conditions described above over a considerable range. For example, the concentration of the trichloroacetic acid in the coating solution may range from about .2% up to the saturation concentration of the trichloroacetic acid in the particular solvent used. However, the higher concentrations of trichloroacetic acid will tend to produce a visible etch on the surface of the film which may be undesirable in some cases although not in others. If it is desired that the final product be completely transparent, a visible etch should, of course, be avoided. On the other hand, if the final product is to be provided with a pencil surface, as by coating it with an organic coating, including silica, the presence of a visible etch may not be objectionable. In most cases it has been found desirable to avoid visible etching of the film since perfectly satisfactory adhesion of most coatings can be obtained without any visible etching.

The temperature at which the film is heated can also be varied over a wide range from about 100° F. to 300° F. It is not desirable to go above 300° F. because beyond this temperature polyethylene terephthalate films become affected. At these higher temperatures the films tend to shrink. It is possible to improve the adhesion of some coatings by treating the surface of the polyethylene terephthalate film with the halogenated fatty acid at room temperature. However in most cases it is preferred to use elevated temperatures. The temperature used will depend to some extent upon the concentration of the acid in the solution. Treatment with weaker solutions at a higher temperature may give the same effect as treatment with stronger solutions at a lower temperature. The length of time that the solution remains on the surface of the polyethylene terephthalate film will also affect the result which is obtained. This will depend upon the construction of the particular coating machine used and some of the other factors, such as the concentration of acid, and the temperature at which it is applied may have to be adjusted accordingly.

*Example 2*

A polyethylene terephthalate film pre-treated according to Example 1 was coated with a solution made up according to the following formula:

10 lbs. of pigment ($SiO_2$)
5 lbs. of alkyd resin-solids
5 lbs. of nitrocellulose solids
1 oz. of cobalt naphthanate containing 6% cobalt (drier)

40 lbs. of solvents (selected from suitable esters, ketones and the like, such as ethyl acetate, butyl acetate and methylethyl ketone)

The finished material was provided with a surface suitable for drafting. Highly dimensionally stable drafting materials of this type are useful where it is desired to make a full scale drawings of a part to be cut out of sheet metal. The drawing can then be applied to the sheet metal and copied thereon by photographic means so that a template is made directly on the metal.

*Example 3*

A sheet of polyethylene terephthalate which had been pretreated according to Example 1 was coated with a film of nitrocellulose lacquer. A conventional photographic gelatin subbing was applied over the nitrocellulose film and then a conventional silver halide type of photographic emulsion was cast on this subbing. This produced an excellent photographic material of high dimensional stability which could be used to reproduce drawings made on the material described in Example 2. The photographic emulsion had excellent adhesion to the polyethylene terephthalate film base and could not be removed by means of cellulose "Scotch" tape, or by severe flexing of the film.

*Example 4*

A solution is made up containing 25% trifluoroacetic acid in toluol. A sheet of polyethylene terephthalate film is dipped in this solution, allowed to drain and dried in an oven at 200° F. Lacquer is coated on this pretreated film in the usual manner. The lacquer has excellent adhesion to the pretreated polyethylene terephthalate film as evidenced by the "Scotch" tape test.

*Example 5*

A solution containing 5% dichloroacetic acid in toluene is flowed over the surface of a polyethylene terephthalate film and drained off. The film is then dried in an oven at 200° F. and coated with a lacquer. The adhesion of the lacquer is greately improved over what it would be without pre-treatment with dichloroacetic acid.

*Example 6*

A hot solution containing 50% of chloroacetic acid in toluene is flowed over the surface of a polyethylene terephthalate film. The excess solution was allowed to drain off and the film was dried by heating it in an oven at 200° F. Lacquer coated on the pre-treated film showed good adhesion.

Having thus described the invention, what is claimed is:

1. The method of pre-treating a high molecular weight oriented polyethylene terephthalate film to make it receptive to coatings of organic materials comprising the steps of coating said film with a solution of an halogenated fatty acid in an inert organic solvent compatible therewith which wets the surface of said polyethylene terephthalate film, the concentration of said halogenated fatty acid in said solution being in the range from 0.2% to a completely saturated solution.

2. The method of pre-treating a high molecular weight oriented polyethylene terephthalate film to make it receptive to coatings of organic materials comprising the steps of coating said film with a solution of a halogenated fatty acid, in an inert organic solvent compatible therewith which wets the surface of said polyethylene terephthalate film the concentration of said halogenated fatty acid in said solution being in the range from .2% to a completely saturated solution, and heating said coated film to a temperature in the range from 100° F. to 300° F. to remove said organic solvent, react said halogenated fatty acid with the surface of said polyethylene terephthalate film and remove the excess halogenated fatty acid.

3. The method of pre-treating a high molecular weight oriented polyethylene terephthalate film to make it receptive to coatings of organic materials comprising the steps of coating said film with a solution of an halogenated fatty acid in an inert organic solvent compatible therewith, which wets the surface of said polyethylene terephthalate film the concentration of said halogenated fatty acid in said solution being selected at an effective concentration which will not produce visible etching of said polyethylene terephthalate film under the particular process conditions employed, and heating said coated film to a temperature in the range from 100° F. to 300° F. to remove said organic solvent, react said halogenated fatty acid with the surface of said polyethylene terephthalate film and remove the excess halogenated fatty acid.

4. The method of pre-treating a high molecular weight oriented polyethylene terephthalate film to make it receptive to coatings of organic materials comprising the steps of coating said film with a solution of trichloracetic acid in an inert organic solvent, compatible therewith, which wets the surface of said polyethylene terephthalate film the concentration of the trichloracetic acid in said solution falling in the range from .2% to a completely saturated solution, and heating said film to a temperature in the range from 100° F. to 300° F. to remove said organic solvent, react said trichloracetic acid with the surface of said polyethylene terephthalate film and remove the excess trichloracetic acid.

5. The method of pre-treating a high molecular weight oriented polyethylene terephthalate film to make it receptive to coatings of organic materials comprising the steps of coating said film with a solution of trichloracetic acid in an inert organic solvent compatible therewith which wets the surface of said polyethylene terephthalate film, the concentration of the trichloracetic acid in said solution being selected at an effective concentration which will not produce visible etching of said polyethylene terephthalate film under the particular process conditions employed, and heating said coated film to a temperature in the range from 100° F. to 300° F. to remove said organic solvent, react said trichloracetic acid with the surface of said polyethylene terephthalate film and remove the excess trichloracetic acid.

6. The method of pre-treating a high molecular weight oriented polyethylene terephthalate film to make it receptive to coatings of organic materials comprising the steps of coating said film with an approximately 5% solution of trichloracetic acid in an inert organic solvent, compatible therewith, which wets the surface of said polyethylene terephthalate film and heating said coated film to a temperature in the range from 100° F. to 300° F. to remove said organic solvent, react said trichloracetic acid with the surface of said polyethylene terephthalate film and remove the excess trichloracetic acid.

References Cited in the file of this patent

UNITED STATES PATENTS

| | | |
|---|---|---|
| 2,805,173 | Ambler | Sept. 3, 1957 |
| 2,805,960 | Wolinski | Sept. 10, 1957 |